United States Patent [19]
VanToever

[11] Patent Number: 5,593,574
[45] Date of Patent: Jan. 14, 1997

[54] WATER TREATMENT SYSTEM PARTICULARLY FOR USE IN AQUACULTURE

[76] Inventor: J. Wayne VanToever, R.R. #2, North Wiltshire, P.E.I., Canada, C0A 1Y0

[21] Appl. No.: 208,716

[22] Filed: Mar. 11, 1994

[51] Int. Cl.$^6$ .............................. A01K 63/04; C02F 3/04
[52] U.S. Cl. ......................... 210/150; 210/169; 210/196; 210/151; 119/227; 137/590.5; 137/593
[58] Field of Search ..................... 210/150, 151, 210/169, 195.1, 196, 202, 264, 285, 416.2; 137/590.5, 593; 119/227

[56] References Cited

U.S. PATENT DOCUMENTS

| | | | |
|---|---|---|---|
| 263,614 | 8/1882 | Stafford | 210/285 |
| 1,620,431 | 3/1927 | Bramwell | 210/264 |
| 1,956,524 | 4/1934 | Byram | 137/590.5 |
| 2,212,932 | 8/1940 | Fairlie | |
| 3,661,119 | 5/1972 | Sanders | 210/169 |
| 3,864,261 | 2/1975 | Masterjoseph | 210/169 |
| 4,062,781 | 12/1977 | Strauss et al. | |
| 4,077,877 | 3/1978 | Orensten et al. | |
| 4,385,988 | 5/1983 | Hypponen | |
| 4,454,038 | 6/1984 | Shimodaira et al. | |
| 4,470,906 | 9/1984 | Frydman et al. | |
| 4,525,276 | 6/1985 | Toda et al. | |
| 4,618,418 | 10/1986 | Heijnen et al. | |
| 4,620,931 | 11/1986 | Hirata et al. | |
| 4,681,685 | 7/1987 | Sutton et al. | |
| 4,832,848 | 5/1989 | Velebil et al. | |
| 4,930,552 | 6/1990 | Estep | 137/593 |
| 5,081,954 | 1/1992 | Monus | 210/169 |
| 5,096,588 | 3/1992 | Albertson | 210/150 |
| 5,126,042 | 6/1992 | Malone | 210/150 |
| 5,227,051 | 7/1993 | Oshima | 210/150 |
| 5,290,437 | 3/1994 | Lin | 210/169 |

FOREIGN PATENT DOCUMENTS

| | | |
|---|---|---|
| 642850 | 6/1962 | Canada |
| 649721 | 10/1962 | Canada |
| 718330 | 9/1965 | Canada |
| 730061 | 3/1966 | Canada |
| 875056 | 6/1971 | Canada |

*Primary Examiner*—Peter A. Hruskoci
*Assistant Examiner*—Theodore M. Green
*Attorney, Agent, or Firm*—Dressler, Goldsmith, Shore & Milnamow, Ltd.

[57] ABSTRACT

The invention relates to a water treatment system and more particularly to a fish tank and biofilter for use in a fish aquaculture. The fish tank has a double outlet system whereby solid waste particles are drawn continually into a central well by a trickle of water flowing through the well and out stand-pipe apparatus exterior of the tank. Clarified water is withdrawn from the center of the fish tank through a manifold having an outlet above the well and conducted to a spray bar of a separate biofilter apparatus. The biofilter includes a rotating spray bar distributing water over a bed of floating media pellets, the water exiting the spray bar causing momentarily and cyclically dynamic flow loading of the bed of pellets below it whereby the pellets are gently agitated. Fine particles in the clarified water to be filtered and biofilter growth particulates gently scoured from the media fall to a cone-shaped bottom of the biofilter tank and gravitate to a central well from which the solid fine wastes can be periodically flushed. The filtered water is returned to the fish tank by a filtered water manifold having an inlet above the bottom of the biofilter tank but below the floating media.

21 Claims, 9 Drawing Sheets

WATER TREATMENT SYSTEM PARTICULARLY FOR USE IN AQUACULTURE

FIELD OF THE INVENTION

The invention relates to a water treatment system and more particularly to a biofilter system using a bed of media material in a downflow filtering system and having general application to the treatment of effluent water but particularly beneficial in the treatment of water used in aquaculture areas. The invention also relates to removal of water from a fish tank clarified of solid wastes and to solid waste removal from the tank.

BACKGROUND OF THE INVENTION

In a conventional tank-based aquaculture operation, adequate water is furnished to each tank so that dissolved oxygen is maintained at appropriate levels and both dissolved and solid wastes are kept at acceptable concentration by dilution with the continual input of clean water. The de-oxygenated water with the dissolved and solid wastes are continually swept out of a drain system which is centrally located in the tank. Since the solids are automatically swept to the centre-bottom of a standard circular culture tank, the exit or drain for solid wastes and waste water to be filtered is located at the centre-bottom of the tank.

Once the solids and waste water exit the tank and enter a small diameter effluent collection pipe, the turbulent high velocity water flow causes the solid waste to be broken down into smaller particles with the resultant creation of fine particulates.

If the fish culture water is to be subsequently re-used for further fish culture, solid and dissolved wastes must be removed and oxygen supplemented. If the waste water is to be returned to a surface water source, (lake, river or the like), current environmental regulations usually require at least removal of solid wastes before it can be returned. This is traditionally accomplished by either using a settling lagoon or expensive mechanical filtration devices. The fine particulates in the waste water require a considerable time to settle out in the lagoon or require complex technology for mechanical removal since the fines require frequent back flushing to prevent filter clogging.

Because of the large flows in even modest sized fish farm operations the settling lagoons (the most common approach) have to be very large to provide adequate time to settle out the fine suspended particulates. The lagoons are generally equal in surface area to the area occupied by the tank farm itself. Because of the size of the lagoons, they are generally only cleaned once or twice per year. The solid wastes that settle to the bottom of the lagoon decompose and generate dissolved wastes which are carried out of the lagoon with the clarified effluent water and therefore enter the receiving surface water. Significant quantities of both nitrogen and phosphorus are released which are the major nutrients responsible for eutrophication of surface waters.

An adequate water filtration system for aquaculture requires adequate fine particle filtration. Biological filters in general work most efficiently when the water, which is to be treated, is prefiltered to minimize suspended solids which otherwise can coat and smother the aerobic bacterial colony and promote the growth of heterotrophic bacteria. When used in aquaculture applications, a mechanical particle filter can be used to remove the larger particulate waste such as fecal pellets and food pellets. However, it is desired to provide a treatment system which effectively removes solid wastes without removing significant amounts of water.

A fluidized bed configuration for filtering dissolved waste water, as shown in my U.S. Pat. No. 5,055,186 issued Oct. 8, 1991, (VanToever), was designed strictly to optimize conditions for bacterial culture using floating low density plastic media in an aerated, fluidized bed.

However, a system which includes a more static bed configuration, thereby reducing the energy requirements otherwise required for a fluidized bed configuration, is desirable. It is also desirable to separate out and remove solid wastes with as little associated water loss as possible and with a minimum use of potentially clogging screens.

It would be desirable in any new treatment system to incorporate a solid waste separation system associated with each tank wherein solid wastes, inherently swept to the centre-bottom of a conventional circular fish tank by the circular flow pattern in the tank, can be selectively removed via a separate exit with a very small flow of water. This can be achieved when a second, separate exit from a tank is provided for clear waste water flow. Clear waste water—clarified water—removal in my new design is via a central stand-pipe with the opening located off the floor, e.g. about mid-water height in the fish tank. The clear water drain is located up off the bottom since if it is located too close to the tank floor, solids would be resuspended from the bottom by the high velocity clear water flow being removed.

Further, early experiments conducted with static beds of low density media revealed that fine particles were mechanically filtered out when waste water was passed through the bed in a fashion similar to a sand filter. Experiments using an upflow configuration wherein the media was retained in the filter by a top screen experienced fine particle accumulation in the filter bed. With the increased pressure caused by restricted water flow, the media were forced against the top screen whereby the bed was compacted and water flow decreased. This necessitated periodic fluidization of the bed with air and the rinsing of particles from the media bed and resulted in a considerable amount of backflush water to rinse out the wastes.

U.S. Pat. No. 4,454,038 to Shimodaire et al granted Jun. 12, 1984 discloses apparatus and process for biological treatment of waste water in a downflow operation. The apparatus includes a reactor (filter tank) having a feeding pipe and a distribution pipe at the top thereof for introducing waste water into the reactor and a withdrawing pipe at the bottom thereof for removing treated water. A particulate carrier or media, has a specific gravity less than that of water whereby the media provides a substantially fluidized bed in a downflow, waste water to be treated. The specific gravity of the media is preferably less than 0.9. In the Shimodaire et al apparatus, water is trickled all over the surface of the floating bed of media and a central draft tube in the aerobic filter design is provided, whereby air is diffused under pressure to carry media, which have come down to the bottom of the reactor by excess attachment thereto of microbes, are caused to rise in the draft tube whereby excess microbes are sloughed off while the media rises up through the draft tube due to the air bubbles. Without a draft tube, a physical stirrer is required to impart a shearing force to the fluidized bed. Further, it appears media material which is caught in the draft tube must also be distributed to the upper surface of the bed through the distribution means. There is no indication of how solid wastes are removed from the reactor and it is clear that screening of the clarified effluent would be required.

It has also been considered necessary in prior art downflow filters to have an elongate, narrow reactor in order to achieve the significant flow rates required to fluidize the bed, thereby making the use of same difficult in areas with height limitations.

Accordingly, it is desirable to provide a downflow biofilter system wherein the filter tank may be relatively wide relative to its height with less violent fluidization and more of a gentle agitated static bed configuration which combines an effective biofilter with a fine particle filter separation and without the need to backflush or periodically fluidize the bed to rinse out waste.

In designing an effective biofilter, it is desirable to provide a thin (1–2 micron) layer of biofilm to ensure that nutrients and oxygen (in aerobic systems) can be transported to the micro-organisms in the interior of the film. If the film becomes too thick, the micro-organisms in the interior will smother, die and decay, which leads to anaerobic conditions, an ineffective filter.

It is further desirable that the filter media be designed to provide a very high surface area per unit volume to maximize the area for growth of micro-organisms (biofilm). At the same time the filter media must continually shed excess biofilm as it grows and accumulates in order to prevent the individual media pellets from adhering together and clumping into masses. This is a problem with conventional biofilters wherein the accumulating biofilm will gradually plug the interstitial spaces between whatever media type is used which causes channeling of the filtrate and smothering of the active biofilm.

SUMMARY OF THE INVENTION

The invention in one aspect uses the cyclic washing action of a spray bar to gently stir the media in a static bed configuration to substantially the whole depth of the media with each rotation of the bar. As the concentrated flow sweeps over a section of the filter bed, it briefly agitates the bed below the bar. This prevents the media from clumping together and washes waste particles through the bed. The particles entering the bed are generally quite fine (most are below 100 microns). It appears however that as the fine particulates migrate down through the bed, they adhere to other particles or perhaps to pieces of biofilm attached to the media pellets. By the time the waste particulates and/or excess biofilm scoured off the media pass out of the bottom of the media bed, they are generally of a larger size with a higher settling velocity. These particles precipitate into the base of the biofilter where they can be removed periodically. With this fine particle removal capability, water flow rates required to grow fish in the system are reduced, since previously, higher flow rates were relied upon to dilute out fine particulates. This is a major advance since it successfully accomplishes the biological filtration and fine particle removal in one simple self cleaning design. Conventional biofilters must have fines pre-filtered since they accumulate and clog the media bed. The inventive filter does not clog, yet effectively filters out the fine particles without compromising biofiltration. The new biofilter, when combined with a double drain fish tank design, enables a reduction of water flow of 95% compared to a conventional flow-through system for an equivalent biomass of fish.

The preferred density of media pellets for water biofiltration, according to this invention, is in the range of about 0.91–0.93 and more preferably, about 0.92. The media pellets are extruded from low density polyethylene which is readily available and inexpensive and one form can be manufactured as set forth in the previous U.S. Pat. No. 5,055,186. Media pellets of a density lower than about 0.91 are too buoyant and do not agitate effectively when contacted by water from the spray bar and as water flows down through the bed. Further a deep bed of low density (less than about 0.91) media pellets also has a non-submerged zone of media which are held above the water level in the filter since they are buoyed up by the media below. This non-submerged zone dissipates the energy of the water falling from the spray bar and the bed below is not adequately stirred which leads to clumping of the media.

Media pellets of a density greater than about 0.93 do not have sufficient buoyancy and will tend to wash out the bottom of the filter. Since screens clog, partly as a result of biofilm growth on the screen, it is desirable to provide a system with no, or at least a minimum of screening. A density in the range of 0.91 to 0.93 and preferably about 0.92, provides sufficient buoyancy to counteract the downward velocity of water movement. The washing, scouring action induced by the concentrated downflow of water prevents buildup of film above the surface of the pellet since excess film is sheared and scoured off by the periodic agitation.

With an essentially static media bed and downflow of water to be filtered, the spray bar preferably rotates using the force of the water to induce the spinning action. Relatively large diameter holes (e.g. 10 mm–12 mm) are used so that a high flow rate is achieved per hole. The large holes are self cleaning since the diameter is sufficient to prevent bridging by biofilm growth. Small diameter holes, if used, rapidly plug.

By using a spray bar, water flow is concentrated so that with each rotation, the effective momentary dynamic flow loading over the small cross-section of filter below the spray is much greater than if the flow was uniformly dispersed over the entire filter surface as would occur with a distribution plate or trough system. The high momentary flows achieved are sufficient to gently stir the filter media bed under the bar to its entire depth. After the spray bar passes, the bed tends to resume a more static state. The bed therefore alternates between a stirred and more static state with each pass of the bar. This process appears to contribute to the effectiveness of the filter in removing fine particles by allowing fine particles to pass slowly down through the bed, adhering to other particles as they slowly descend which increases the particle size and settling velocity as they exit the bed. Further, the cyclical dynamic flow loading of the bed provides for good agitation of media over the full width and depth of a relatively wide filter tank, without the large flow rates normally required in the long narrow prior art reactors or filters in order to properly fluidize the media bed in a downflow system.

Waste particulates precipitate to and are concentrated in the cone-shaped filter base where they are removed periodically by opening a valve and flushing them to waste.

The new filter design also facilitates scale-up since increased filter diameters simply require a proportional increase in flow rate per unit of surface area and an increased spray bar length to deliver the flow uniformly over the surface of the media bed.

Moreover, the new filter design has also alleviated the need for any screening devices on either the inlet or outlet side of the media to retain it in the filter and therefore the need for any screen cleaning or backflushing maintenance or equipment. A combination of the media density and proper hydraulic loading ensures the media bed floats at the top of the water column in the filter tank, the pellets being buoyant enough to stay in the filter without being washed out, yet heavy enough not to create a non-submerged zone at the top.

DETAILED DESCRIPTION OF PREFERRED EMBODIMENTS OF THE INVENTION

A new filter design was developed which would embody two processes, i.e. nitrification and fine particulate separation or filtration in one filter without compromising either process while maintaining a relatively simple design without use of potentially clogging screens. Further, clarification of water in the fish tank is provided with the removal of particulate, solid waste via a double drain system, the clarified water being pumped to the biofilter where fine particle separation occurs.

Turning to FIGS. 1 to 5 wherein a schematic, perspective view and partly cut away side view of a first embodiment of the invention is shown, circular fish tank 20, with side wall 22 and bottom wall 24, has a central well 26 with solid waste effluent conduit 28 leading therefrom under fish tank 20 to stand-pipe 30. As more particularly shown in FIG. 3, outer pipe 32 of stand-pipe 30 has a lower end with a slightly tapered opening 34 which leads to drain 36 which is a conduit which may also act as a drain for additional, similar fish tank and biofilter assemblies. Hollow cylindrical inner pipe 40 of stand-pipe 30 has an open lower end 42, the periphery thereof being adapted to plug lower end opening 34 of outer pipe 32. Upper end 44 of inner pipe 40 has handle means 46 secured thereto, thereby enabling inner pipe 40 to be pulled vertically slightly to permit water from tank 20 to flush waste sediment in well 26 through conduit 28 to drain 36. Slightly conical plug 47 secured to inner pipe 40, adjacent upper end 44, helps center the inner pipe but this is not critical. Overflow aperture 48 in the side of inner pipe 40, is substantially water height, that is, at the height 50 of water in tank 20 and the water in stand-pipe 30.

Figure 3:
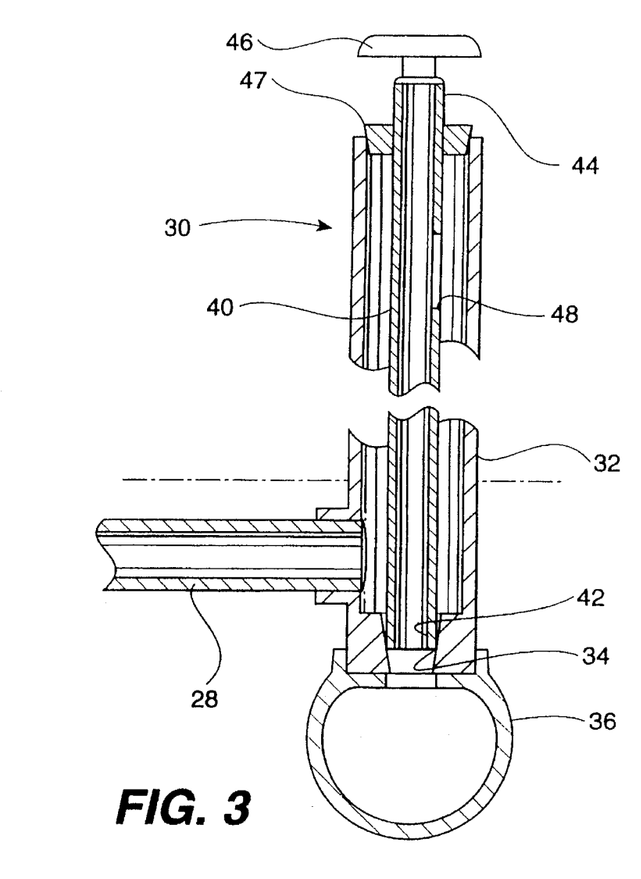
FIG. 3 is an enlarged, sectional view of the solid waste stand-pipe for removing solid waste from the fish tank, taken along line 3—3 of FIG. 1.
Figure 4:
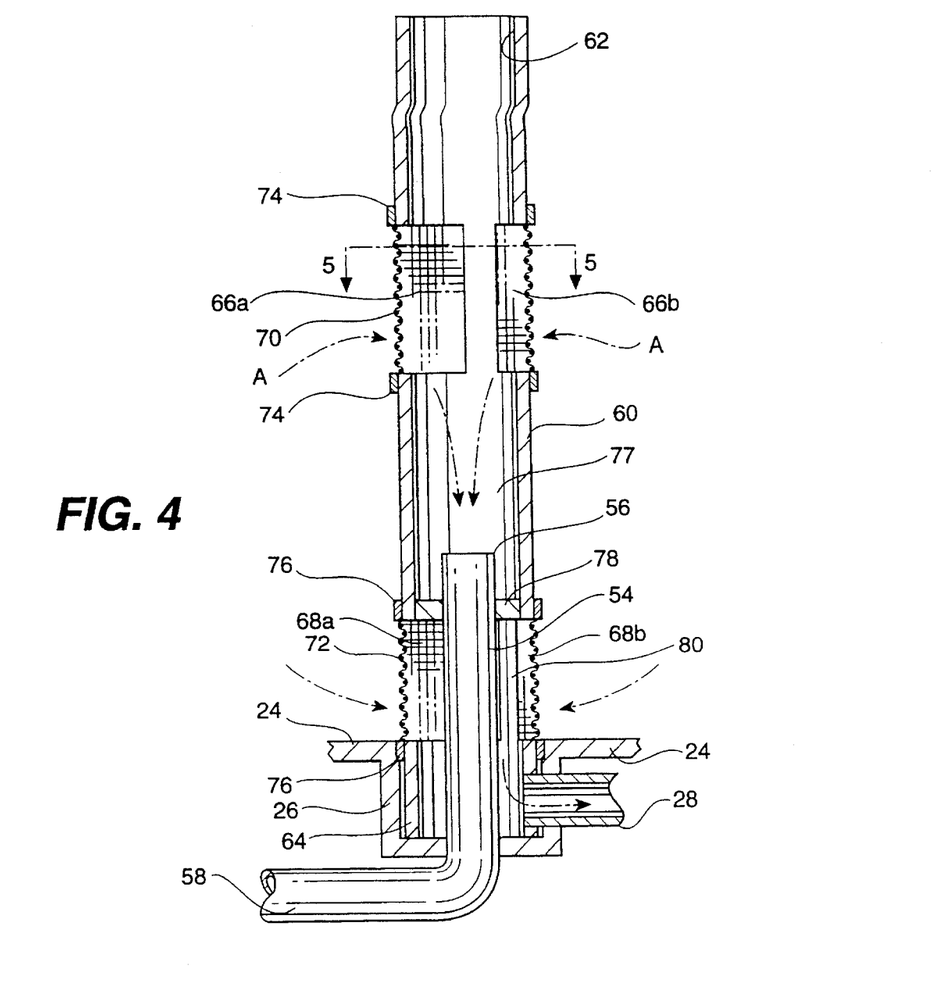
FIG. 4 is an enlarged, sectional view of the solid waste well of the fish tank and of the screened outlet for removal of waste water to be treated, taken along line 4—4 of FIG. 1.
Figure 5:
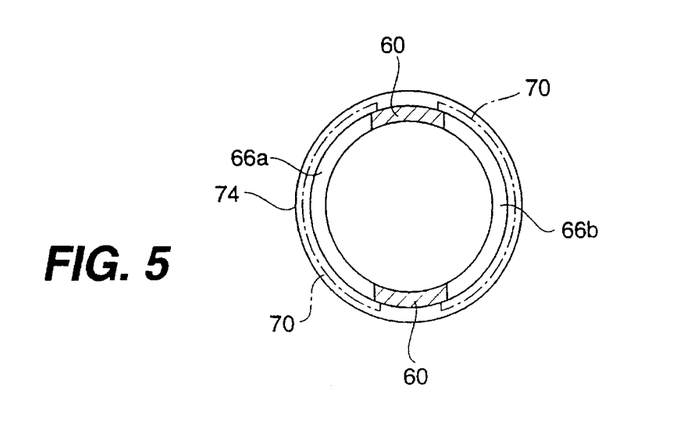
FIG. 5 is a sectional view taken along line 5—5 of FIG. 4.

When the height of water in tank 20 rises over a predetermined normal height, water within stand-pipe 30 also rises and flows into aperture 48, down inner pipe 40 to drain 36. Thus any increase in the height of water in the tank 20 over a desired height is effectively controlled automatically. As will become more evident herein, overflow aperture 48 also serves in the operation of the system to draw solid waste collecting at the center of tank 20 into well 26 and conduit 28.

Extending coaxially with and upwardly through well 26 is inlet manifold 54 for clarified water to be filtered (that is, water to be filtered that has been clarified due to the separation and withdrawal of solid wastes from the bottom of tank 20 through well 26). Manifold 54, as shown more particularly in FIG. 4, has an open upper end 56 leading to conduit 58 beneath tank bottom 26. Surrounding inlet manifold 54 is pipe 60 having open top 62 (above water height) and bottom 64, which bottom extends into well 26, closely fitting the periphery thereof and being in flow communication with conduit 28. Pipe 60 has upper and lower cut-out sections 66a, 66b and 68a, 68b covered with screen or mesh 70, 72 secured to pipe 60 by clamps 74 and 76. The upper cut-out sections 66a, 66b permit clarified water to enter pipe 60 and into area 77 surrounding open end 56 of manifold 54 (arrows A). The lower side cut-out sections 68a, 68b of pipe 60, covered with screen 72, permit solid wastes which have gravitated to the bottom-center of the tank 20 to enter area 80 of pipe 60 and well 26, to be periodically flushed from well 26 and conduit 28 to drain 36 when inner pipe 40 of stand-pipe 30 is pulled. Horizontal plate 78, within pipe 60, seals off area 74 from area 80. The screen or mesh size of the screens 70 and 72 is only such as to prevent fish from escaping the fish tank and is not of a size to hinder the flow of clarified water or waste solids.

The lower end of clarified water inlet manifold 54 communicates with conduit 56, which in turn communicates with pipe 84 having lower end 86, upper end 88 and removable inner stand-pipe 90 with handle 92, for permitting, when handle 92 is pulled upwardly slightly, the flushing of manifold 54 and conduit 56. The lower end 86 of pipe 84 and the lower end 94 of inner stand-pipe 90 are similar to those for stand-pipe 30, more particularly shown in FIG. 3, with lower end 86 of pipe 84 being connected to drain 96 which may also act as a drain for other similar assemblies. Associated with conduit 56 is centrifugal pump 98 located in access well 100 and which pump is capable of pumping water through the fish tank system.

Figure 1:
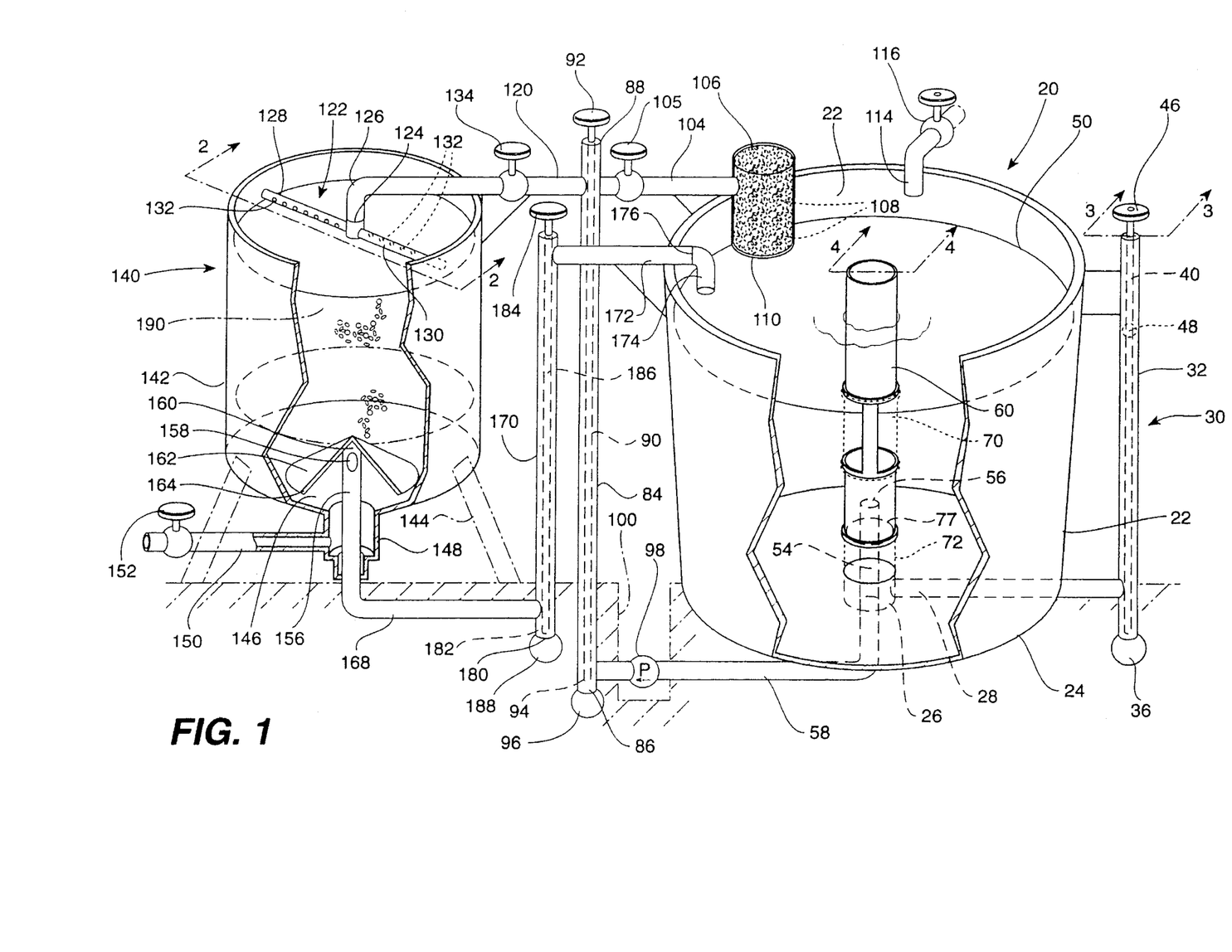
FIG. 1 is a schematic perspective view, partly cut away, of a first preferred embodiment of the invention showing a fish tank and biofilter system.

Conduit 104, with flow control valve 105, leads from pipe 84 to a conventional degasifier/aerator 106 containing a plurality of moulded plastic configurations 108, through which water is pumped to aerate the water and remove carbon dioxide. Degasifier/aerator 106 is conventional and further details are not required for an understanding of this invention. Water flows out bottom 110 of degasifier/aerator 106 to tank 20.

Conduit 114, with flow control valve 116, continually feeds make-up water to fish tank 20 from a source (not shown), as will become more apparent herein.

Conduit 120, adjacent the upper end 88 of pipe 84 leads to a rotatable filter spray bar 122, spray bar 122 being suitably mounted by water lubricated bearing 124 for rotation about pipe end 126. Spray bar 120 has opposed arms 128 and 130 and rotation of spray bar 120 is caused by water exiting from nozzles 132 suitably located on opposite sides respectively of arms 128 and 130. Valve 134, in conduit 120, allows for controlling the flow of water to spray bar 122.

Figure 2:
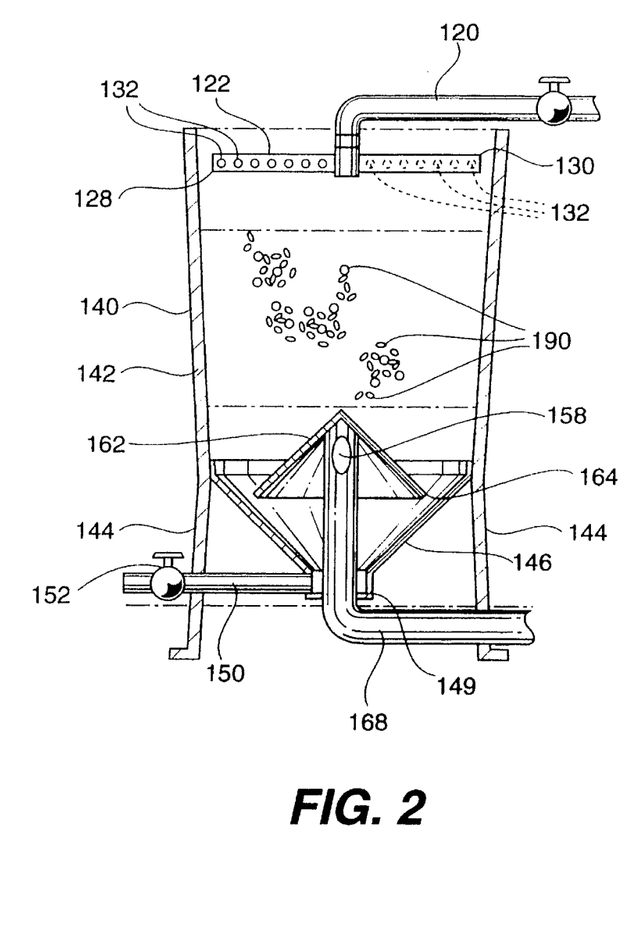
FIG. 2 is a schematic sectional side view of the biofilter of the embodiment of FIG. 1, taken along line 2—2 of FIG. 1.

Open top filter tank 140 has cylindrical walls 142 and is supported on peripherally spaced legs 144 (only two shown). Tank 140 has closed cone-shaped bottom wall 146 leading to well 148 and precipitate removal conduit 150, valve 152 selectively permitting withdrawal of particulate concentrated waste out of well 148 and conduit 150 to a drain (not shown) but which drain may be separate from or connected to drain 36 and/or 96.

Extending upwardly from and coaxial with well 148 is filtrate manifold 156 having a side wall opening 158 near its upper end 160. The upper end 160 is closed by a downwardly, outwardly directed, inverted, cone-shaped effluent baffle 162, the lower edge 164 of baffle 162 being peripherally spaced from cone-shaped bottom wall 146. Filtered water manifold 156 communicates with conduit 168 and pipe 170 and filtered water return manifold 172 which returns filtered water to tank 20. End 174 of manifold 172 can be selectively swivelled at 176 to control the angle of water returning to fish tank 20 and thereby the speed of rotation of water in tank 20.

Lower end 180 of pipe 170 and lower end 182 and handle 184 of inner stand-pipe 186, provide for flushing out manifold 156 and conduit 168 as desired to drain 188 in a manner similar to that of stand-pipe 30 shown in FIG. 3. Drain 188 can be connected with or the same as drains 36 and 96.

Figure 6:
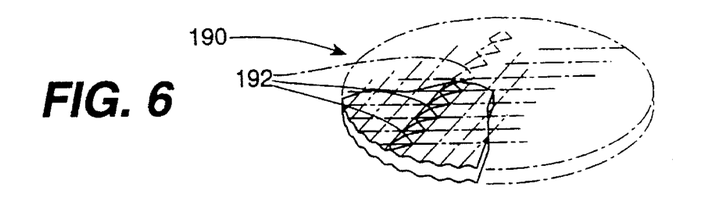
FIG. 6 is a perspective view of a media pellet of one configuration.
Figure 7:
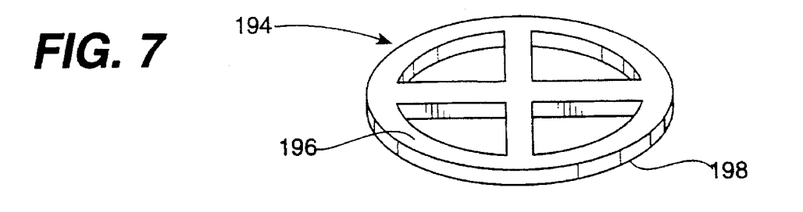
FIG. 7 is a perspective view of a media pellet of a different configuration.

Filter media pellets 190, described earlier and shown in FIGS. 6 and 7, free float in water in filter tank 140. FIG. 6 shows a perspective view of one media pellet 190 having grooves 192 in opposed side surfaces and to which biofilm adheres and grows. Media pellet 194 in FIG. 7 is an alternative embodiment and has centre cross arms 196 with peripheral ring 198. The pellets are of a plastic material, preferably polyethylene, having a density of about 0.91 to 0.93, a diameter of about 5 mm and a thickness of about 2 mm. Sufficient media is included in filter tank 140 for the purpose of promoting bacterial growth on the face and sides of the media to biofilter the water. When the system is operating, the bed of media 190 preferably floats just above the top of cone-shaped baffle 162 and is of a depth of about 76–91 cm (30–36 inches), (see FIG. 2). Media pellets 190, 194 can be sliced the desired thickness from an extruded bar of material, pellets 190 being further processed to add the appropriate grooves. The height of water in filter tank 140 is about 7.6–25 cm (3 to 12 inches) above that in fish tank 20. Accordingly there is provided a gravity head return of filtered water through manifolds/conduits/pipes 156, 168, 170 and 172 to fish tank 20.

As will be seen from this embodiment, there are no screens associated with the filter tank or filtrate manifolds which could become clogged or require periodic cleaning or back flushing.

In operation, assuming the fish tank 20 contains water and filter tank 140 contains water and media pellets 190, circular movement of water in fish tank 20 causes precipitates (fish food pellets, excrement or fecal pellets and the like) to gravitate along the bottom 24 to the center of tank 20.

Make up water flows into tank 20 through conduit 114. The height of water in stand-pipe 30 is at the level of water in tank 20 and with aperture 48 at substantially the desired height of water in tank 20, an amount of water substantially equivalent to make-up water flowing into fish tank 20 flows out through aperture 48, into inner pipe 40 and out drain 36. There is therefore a continuous trickle of water exiting the bottom of tank 20, through screen 72 and into well 26, through conduit 28 into stand-pipe 30 and through aperture 48, inner pipe 40 to drain 36. The flow of this trickle of water can be regulated by the volume of make-up water being added to tank 20 through conduit 114 and is sufficient to draw solid wastes through screen 72 into well 26 and conduit 28. The flow is gentle enough that little break-up of feed pellets, fecal pellets and the like occurs and water exiting aperture 48 into drain 36 is substantially clear of waste solids, these solids collecting in well 26 and conduit 28. Periodically, e.g. once or twice a day, inner pipe 40 is pulled for a short period of time so that a substantially greater flow of water, due to the head in tank 20, flushes precipitates and solid wastes out well 26 and conduit 28 directly to the drain 36.

Accordingly, solid wastes are continually removed from the center of the fish tank 20 and are not continually circulated therein whereby they could break-up and add further suspended fine particulate to the water in fish tank 20, thereby causing it to appear cloudy. The solid waste withdrawal is self-regulating and the flow of make-up water is controlled to maintain a movement of solids out of the tank 20 to thereby reduce the possibility of resuspension of such solids in tank 20. The clarity of the water in the tank is maintained.

Clarified water to be filtered enters manifold 54 through screened inlets 66a, 66b, flows into conduit 56 and is pumped via pump 98 up pipe 84 to conduits 104 and 120. Approximately one half of the flow passes through return conduit 104 to tank 20, passing through degasifier/aerator 106. The water is caused to flow over and around plastic media 108 and is aerated, while at the same time releasing carbon dioxide from the water, the aerated water obtaining a desired level of oxygen.

The other approximate one-half of the flow up pipe 84 passes through conduit 10 into spray bar arms 128, 130 and out nozzles 132, the exit of the water from nozzle 132 causing rotation of spray bar 122 and cyclic dynamic flow loading substantially evenly around the upper portion of the filter tank 140 on media 190.

Water in filter tank 140 flows downwardly through media 190 with the bacteria growth on the media biofiltering the water. The flow of water from nozzles 132 onto the top of the media 190 causes floating media or pellets 190 to be gently moved and stirred in a cyclical fashion. This occurs for the full depth of media, usually about 76–91 cm (about 30–36 inches). Further, water moves downwardly in tank 140 and the natural movement of media 190 caused by the cyclical hydraulic loading and water movement causes pellets 190 to gently scour each other to remove excess biofilm growth.

Particulates scraped from such excess growth appear to clump together as they move downwardly and below the media bed. The particulates are directed downwardly, outwardly by inverted cone-shaped baffle 162 and then inwardly to well 148 by cone-shaped wall 146. Biofiltered water flows downwardly around the lower edge 164 of baffle 162 and upwardly to outlet 158. Filtered water then flows back to the tank 20 through manifolds/conduits/pipes 156, 168, 170 and 172.

As previously noted, a simple disc shaped media pellet 190, made from polyethylene, has been found to be the easiest to fabricate and the most effective for culture of the biofilm. The small filter media pellet size (2 mm thickness, 5 mm diameter) provides over 1500 $m^2$ of surface area per $m^3$ of filter volume. By way of example, the pellet 190, (FIG. 6), has shallow, less than 1 mm depth, grooves formed into the upper and lower surfaces during manufacture, the grooves providing a shelter for growth of biofilm and the shallow depth ensuring optimal biofilm thickness so that the base of the film receives oxygen and nutrients. If a biofilm is too thick, oxygen and nutrients cannot diffuse to the inner portion of the film which will die and become anaerobic. In using spray bar 128, water flow is cyclically concentrated so that with each rotation, the effective dynamic flow loading over the small cross section of filter media 190 below the spray is much greater than if the flow was uniformly dispersed over the entire filter surface as would occur with a distribution plate. The washing action induced by the cyclical concentrated flow loading of water from the spray bar prevents build-up of film much above the surface of the pellet since excess film is sheared or scoured off by the periodic agitation. The spray bar 128 rotates at about 10 rpm and uses the force of the water to induce the spinning action. Large diameter holes 132, about 10 to 12 mm, (about ½ inch) diameter, are used so that a high flow rate is achieved per hole. The large holes are self cleaning since the diameter is sufficient to prevent bridging by biofilm growth. Small diameter holes would rapidly plug.

Unlike other systems, no back flushing of the filter tank 140 is required to clean screens or the like associated with the filtered water outlet 158.

It will be appreciated that some of the conduits, such as conduits 28, 56, 168 and drains 36, 96 and 188, which have been shown below grade, could be conveniently located above ground if the fish tank 20 and filter tank 140 were supported on a platform or the like as is often the case with smaller tank configurations.

Figure 8:
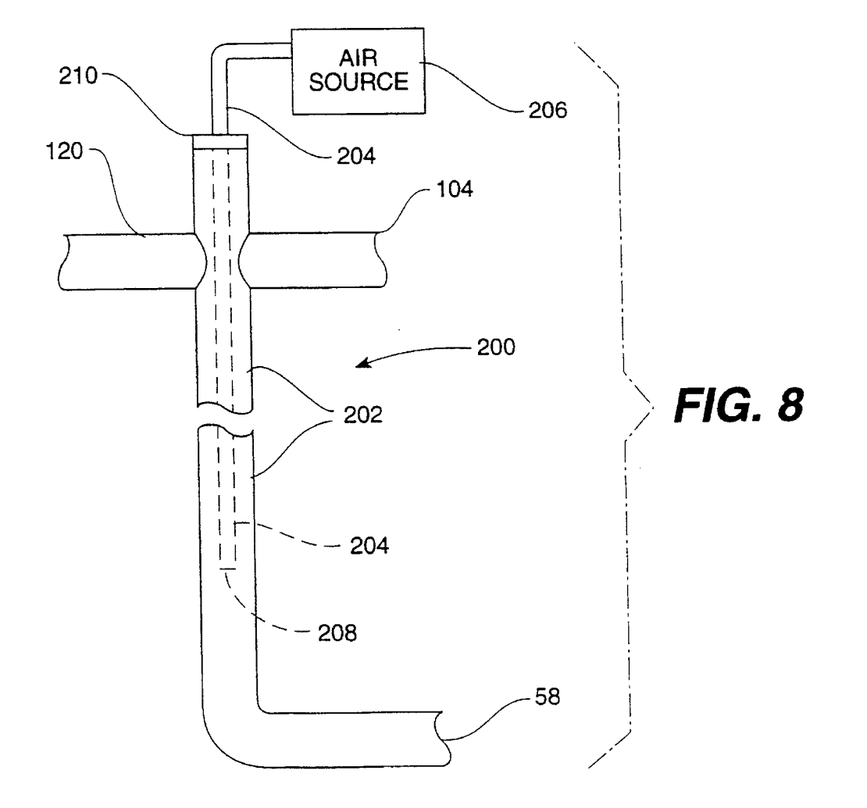
FIG. 8 is a partial schematic side view of an air pump for use in the system.

Although a centrifugal pump 98 is used in the embodiment of the invention shown in FIG. 1, it will be appreciated that an air lift pump 200, as shown in FIG. 8, could be used in pipe 202, which pipe would replace pipe 84 as shown in FIG. 1. Air lift pump 200 comprises outer pipe 202 and inner pipe 204, inner pipe 204 being connected to a source of compressed air 206 in the conventional manner. Compressed air exits the lower open end 208 of pipe 204 and carries water up pipe 202 to conduits 104, 120 as it rises and exits at upper end 210 of pipe 202.

Figure 9:
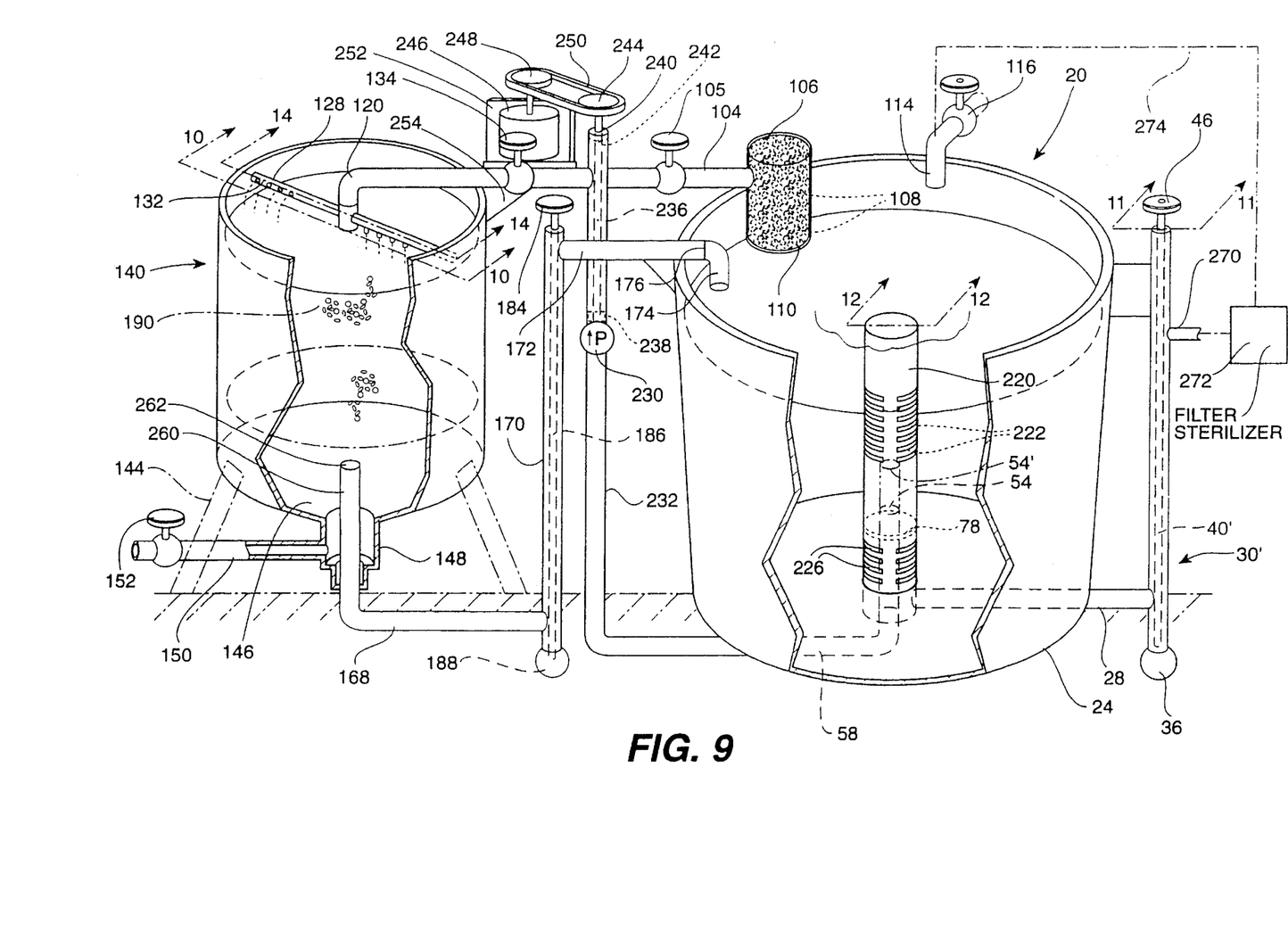
FIG. 9 is a schematic perspective view, partially cut away, of a modified preferred embodiment of the invention showing a fish tank and biofilter system.
Figure 12:
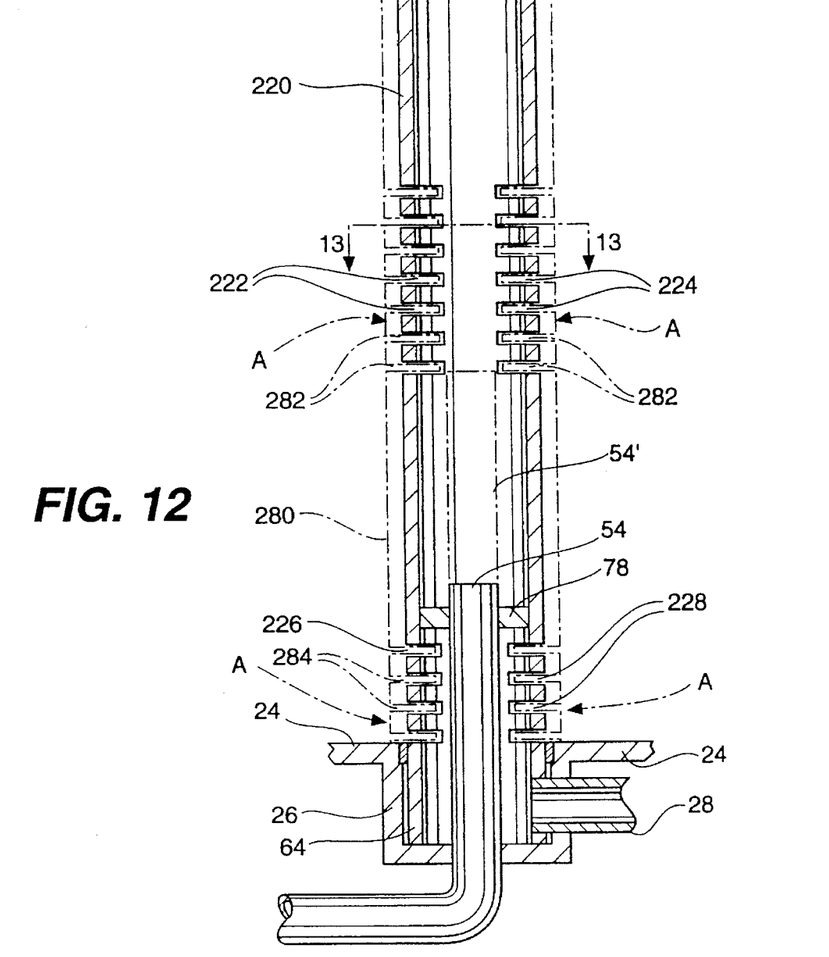
FIG. 12 is an enlarged sectional view taken of the solid waste well of the fish tank and of the waste water removal outlet, taken along line 12—12 of FIG. 9.
Figure 13:
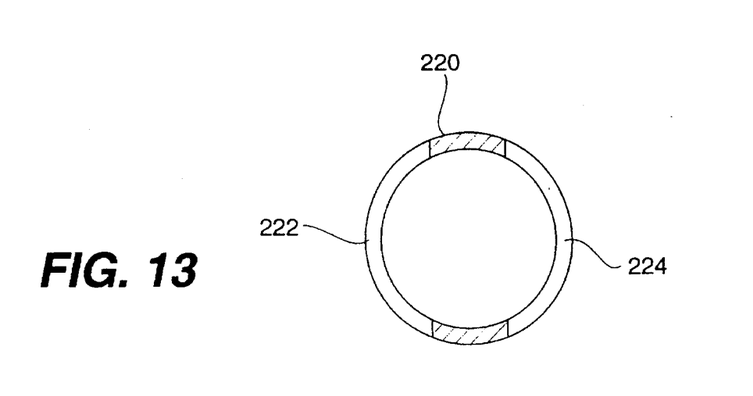
FIG. 13 is a sectional view taken along line 13—13 of FIG. 12.

Turning to FIGS. 9 to 15, a further preferred embodiment is shown which is similar in many respects to that in FIGS. 1 to 5 but has certain modifications as noted herein. However, features and structural elements in FIGS. 9 to 14 which are similar to, or the same as those in FIGS. 1 to 5, are designated with the same reference characters. The major differences, in the embodiment of FIGS. 9–15 from that in FIGS. 1–5, are in the clarified water inlet to be filtered, the pump system and the filtered water return manifold. More particularly, in the embodiment of FIGS. 9–15, there is shown in FIGS. 9 and 12, a clarified water manifold inlet 54 which is shielded by pipe 220 which, instead of screened cut-out portions, simply has a series of slots 222, 224 in the side wall above plate 78 and a series of slots 226, 228 below plate 78, the slots essentially being the same. The slots are simply cut with a saw or the like in the wall of pipe 60, the width of the slots being chosen depending on the size of the fish in the tank. For example, for feeding fry, a slot of about 1.5 mm wide is appropriate, (the feed being 0.5 mm to 1 mm diameter pellets); fingerlings up to 50–60 grams, a 3 mm slot can be used, (the feed pellets being 1 mm–2.5 mm) and for fish greater than 50–60 gm, a 6 mm slot can be used (the feed pellets being about 6 mm). For starter fry, 1.5 mm holes rather than slots are preferred to reduce the possibility of tails being sheared off due to the fry being sucked into the slots. It is also possible to run the system without plate 78, if inlet 54 is extended as shown at 54' in FIG. 12, to increase the separation between inlet opening 56 and well 26.

A further modification is provided by a belt driven axial flow impeller pump 230 associated with vertical transfer pipe 232 which is connected to pipes 104 and 120. Pump 230 has an axial flow impeller 234 driven by shaft 236 suitably mounted in pipe 232 with lower bearing 238 and upper thrust bearing 240, upper bearing 240 being associated with the top 242 of pipe 232.

Pump 230 is located below water height in tank 20 so it need not be primed. Pump pulley wheel 244, secured to shaft 236, is driven by electric motor 246, through motor pulley wheel 248 and belt 250. Motor 246 is suitably supported and mounted to platform 252 which can be secured to filter tank 140 at 254 (or otherwise supported separate from tank 140).

Figure 14:
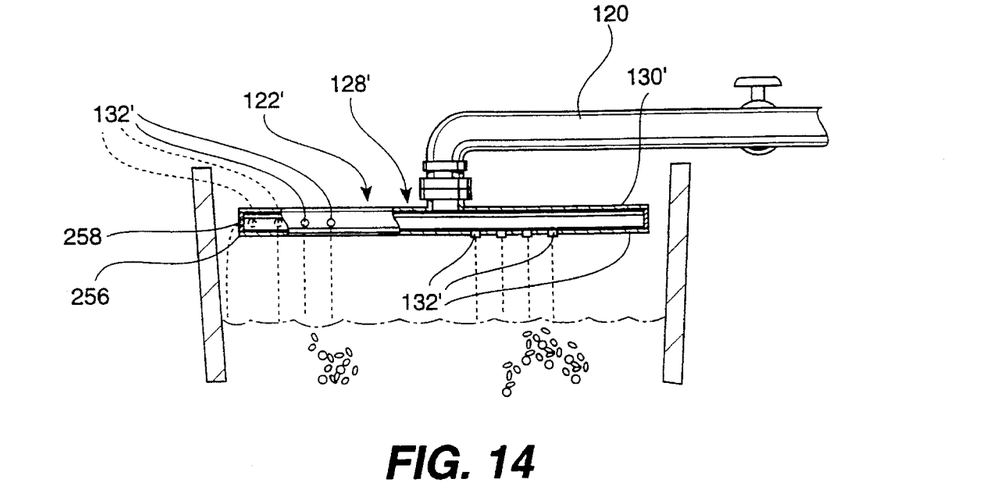
FIG. 14 is an enlarged, partly sectional view of the spray bar taken along line 14—14 of FIG. 9.
Figure 15:
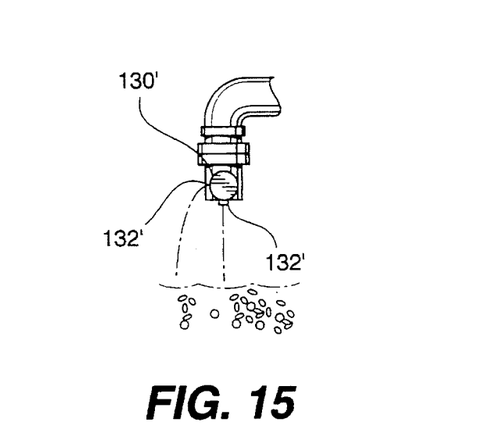
FIG. 15 is an end view of the spray bar of FIG. 14.

Another variation in the embodiment illustrated in FIGS. 9–15 and more particularly shown in FIGS. 14 and 15, is in the spray bar 122'. As seen from FIG. 14, nozzles or openings 132' on arm 128' are located from the middle of the arm outwardly to the end 256 with an opening 258 being in the otherwise closed end 256. Arm 130' has nozzles or openings 132' in the bottom thereof including the center of the spray bar 122' and outwardly until midway on the arm 130'. Water exiting the nozzles or openings 132' on arm 128' causes rotation of the spray bar 122' and effects cyclical dynamic flow loading of the outer half of the media bed 190. Water exiting from the nozzles 132' on arm 130' effects cyclical dynamic flow loading of the central and inner half of the bed 190. The cyclic loading of the media bed is enhanced by a spray bar of this construction.

Figure 10:
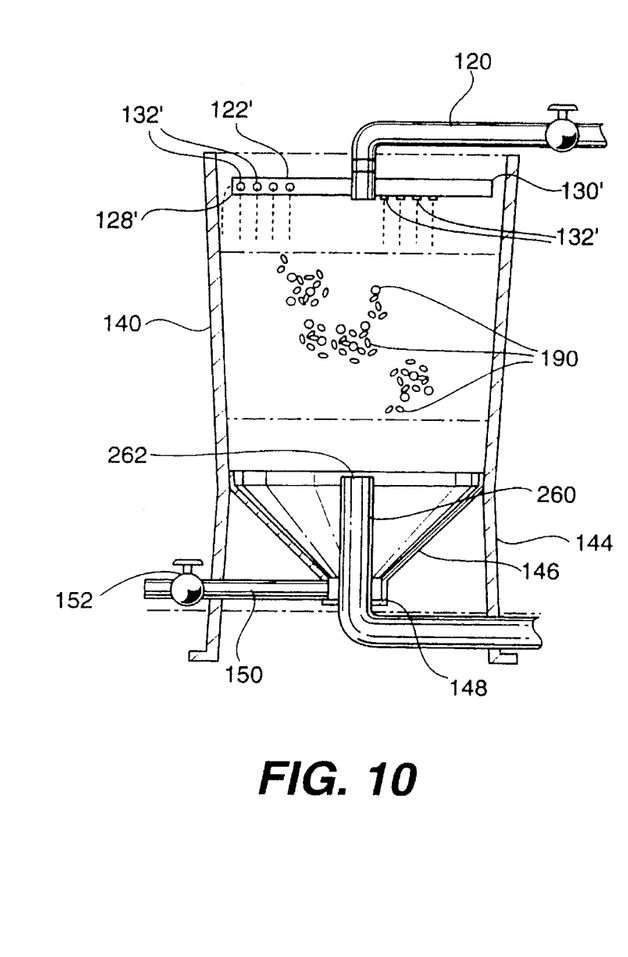
FIG. 10 is a schematic sectional side view of the biofilter of the embodiment of FIG. 9 taken along line 10—10 of FIG. 9, a variation in the water to be filtered in the pipe.
Figure 11:
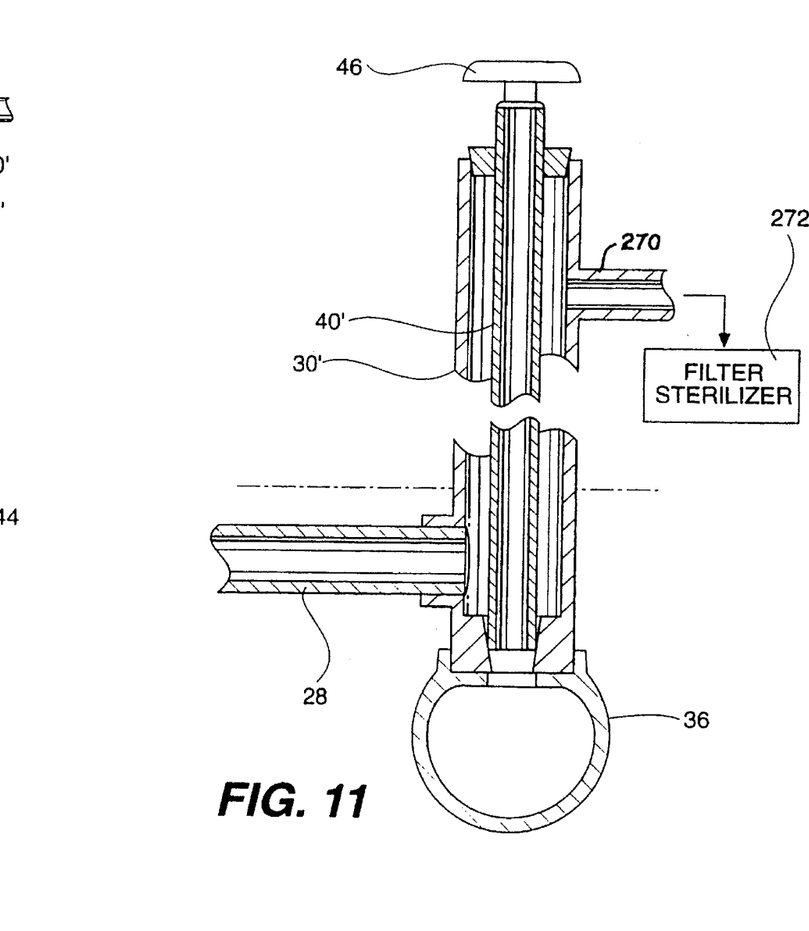
FIG. 11 is an enlarged sectional view of the solid waste stand-pipe for removing solid waste from the fish tank, taken along line 11—11 of FIG. 9.

Further, with respect to the modified embodiment, there is no inverted cone-shaped baffle used with manifold 260, manifold 260 simply being open at top 262, thereby permitting filtered water to flow directly into manifold 260 from the tank 140. Experiments have demonstrated that even without a screen or the like associated with opening 262, there is little precipitate or particulate material falling from the media bed entering manifold 260. The benefit of having a filtered water outlet without any screening means is significant when compared to the added cost of having to clear a screen. The system is operated with a 7.6–25 cm (3 to 12 inch) head differential between the level of water in filter tank 140 and the level of water in fish tank 20 and accordingly, the gravity feed of clarified water from filter tank 140 to fish tank 20 is not such as to cause agitation or the stirring up particulate material settling on filter tank bottom 146 or in well 148 or to cause much of the precipitate or particulate to be sucked into the open top and unscreened manifold 260.

A still further variation shown in the embodiment of FIGS. 9–15 is with respect to stand-pipe 30'. Rather than inner pipe 40' having an aperture 48, whereby a trickle of water, due to make up water entering the tank by conduit 114, is passed continually to drain 36 in order to draw out the solid wastes from tank 20 into drain 26 and conduit 28, outer pipe 30' has a T-connection with conduit 270 leading to a filter/sterilizer 272, the filter section removing fine particulate and the ozone or ultraviolet light sterilizer section sterilizing the water for return to the system through make-up water conduit 114 as shown by dotted line 274. In this variation, the only make up water required is that necessary to replenish the amount lost to the system due to the periodic flushing of well 26 and well 148. One of the advantages of using a modular system, wherein each tank 20 has its own filter tank 140, is that it is easier, if disease in the fish breaks out, to isolate it to the particular tank system. However, only so much hardware can be cost effectively associated with each modular system. In a system including the variation of a filter/sterilizer unit 274, it is contemplated that the water from several modular systems would be filtered and sterilized with one filter-sterilizer unit. Since the water returned to each modular system would be sterilized, the possibility of transmission of disease from one system to another is virtually eliminated. It should also be appreciated that the clarified water exiting aperture 48 to drain, is sufficiently low in fine particulate that it could be returned to fish tank 20 or placed in flow communication with water being conduited to spray bar 122.

A still further variation with respect to the inlet pipe 60 for clarified water to be filtered, is provided where pipe 60, having slots 222, 224, 226, 228 sized for use with large fish, is adapted to have one or more separate overlay pipes or sections 280 shown in FIG. 12 in dotted lines, each overlay pipe having predetermined sized smaller slots 282, 284 (or screen mesh associated with cut-out portions). The overlay pipe can be telescopingly associated with pipe 60 for permitting tank 20 to be easily converted for use from time to time with varying sized fish.

Figure 16:
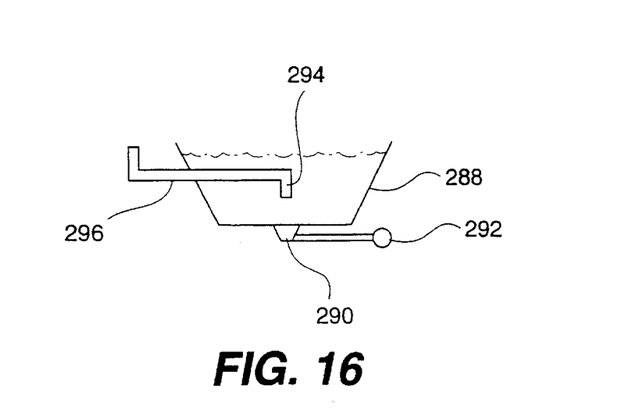
FIG. 16 is a schematic view of a variation of the clarified water effluent pipe.

Finally, there is shown in FIG. 16 on a schematically reduced scale, an existing large fish tank 288 in a flow through system, wherein there is already a central drain 290 for both solids and waste water in flow communication with manifold 292 leading to a settling pond (not shown). In such systems where the fish tank 288 is large and permanently installed, it may be cost effective retrofit to simply convert drain 290 and manifold 292 to a waste solids drain system with a clarified water inlet manifold 294 being supported from above (not shown) in the center of tank 288 and leading off to pipe 296, which is preferably below water height to avoid the need for a self priming pump. Pipe 296 communicates with a modular biofilter unit (not shown) associated with tank 288. Flow of solid waste into and out of well 290 could be controlled by a standpipe system as shown in the above embodiments associated with drain 292.

In prototype testing, replicate 2 m$^3$ tanks equipped with 0.125 m$^3$ biofilters were stocked with 60 kg (30 kg/m$^3$) of Arctic char of 162 g average weight. Make-up water flows were set at 1.5 l/min and flows through the biofilters were about 60 l/min (hydraulic loading of 0.46 m$^3$/m$^2$/day. (Hydraulic loading is the amount of water (m$^3$) in a day contacted by the total area of biofilm growth on the media (m$^2$)). Airlift aeration flows were about 90 l/min. Fish were fed to satiation daily. After 3½ months, the fish had grown to an average weight of 352 g with total biomass of 130.4 kg (65 kg/m$^3$). The predicted size of these char using a hatchery growth rate in a flow through system (unpublished data) was 337 g. Therefore, the char in the biofilter systems grew as well if not better than those in flow through systems. By the end of the trial, more than 1 kg of feed at 46% protein content was being consumed daily, resulting in the production of about 18 g NH$_4$-N day. The average specific activity of the biofilters was 170 g-N/m$^3$/day for an average biofilter capacity of 21 g-N/day. The biofilter contained pellets as noted herein and a rotating spray bar. Total suspended solids in the fish tank ranged from 0.9–3.4 mg/l with the mean being 1.2 mg/l.

The average single pass reduction of ammonium concentration through the biofilter was about 43%. The percent reduction of ammonium decreased with increasing hydraulic loading rates which is typical of all biological filters. (Rogers and Klemetson, Aquatics Engineering 4 (1985) 135–154). In a comparison between four different types of biofilters with data from the system herein and Rogers & Klemetson, the biofilter system herein remained at least 43% efficient at hydraulic loadings where other biofilters were washed out. Nitrification capacity of a biofilter equals efficiency×hydraulic loading. A rotating biological contactor operating at 70% efficiency with initial ammonia concentration of 1 mg/l and a hydraulic loading of 0.08 results in a nitrification capacity of 6.7 g-N/day. A biofilter herein operating at 45% efficiency with the same ammonia concentration and a hydraulic loading of 0.46 gives a nitrification capacity of 26 g-N/day. However, unlike other biofilters, the biofilter herein exhibited an increase in specific activity (nitrification capacity per unit of filter volume per day—g-N/m$^3$/day) with greater hydraulic loadings: See FIG. 17. In other words, the nitrification capacity of the biofilter herein increased with throughput and it increased hydraulic loading and did not level off or drop within the same loading range as experienced in other biofilters. This is believed due to the expansion of the media bed allowing more active surface area to develop.

Operation of the system was simplified by its design. The airlift pumps require little or no maintenance. Twice daily drainings of solid waste from the fish tank used about 50 l and a daily 2 second opening of the solid waste valve resulted in a loss of about 5 l of water. Even a weekly backflushing of the media bed would use about 100 l of water. All these losses can be easily handled by the make-up water flow. A comparable tank of Arctic Char operating as flow through required 32 l/min of well water, the biofilter 1.5 l/min. Therefore, the biofilter system herein achieved a 95% reduction in water usage over a typical flow through operation.

Further tests were run with a fish tank 20 of about 2.5 meters (8 feet) in diameter holding 4 cubic meters of water (about 1.25 meters deep), contained a biomass of arctic char, about 85 kilograms of fish/cubic meter volume (340 kilograms of fish for the tank). The fish tank water temperature was about 7° C. with a fish feed rate of about 1% body weight per day.

About 1–2 liters per minute of make-up water (conduit 114) flowed into the tank 20 causing about the same outflow through the tank well to a stand-pipe 30 and drain 36, thereby maintaining a draw off of solid wastes into well 26 and conduit 28. Inner stand-pipe 40 was pulled once a day to flush out drain 36. Spray bar 122 was about 30 cm (about 12 inches) above the level of water in tank 140 with the head differential between the water in biofilter tank 140 and fish tank 20 about 7.6 cm (about 3 inches). Spray bar 122 passed about 250 liters/min having about 12 mm (½ inch) holes on 5 cm (2 inch) centers and rotated about 10 rpm. The filter surface area of media 190 was about 0.8 m$^2$ and the loading flow over the surface about 0.325–0.350 m$^3$/m$^2$/min. The depth of media bed 190 of solid polyethylene pellets about 2 mm thick by 5 mm diameter was about 76 cm (about 30 inches). The pellets provided about 1500 m² of surface area per cubic meter of filter volume.

The volume in the biofilter tank 140 was about 1/10 that in the fish tank. The flow of water into the biofilter through spray bar 122 was about 50% of that pumped by the hydraulic axial flow pump 230 (¼ horsepower pump, about 500 liters/minute) so that about 250 liters/min water passed back into the fish tank through degasser/aerator 106 and 250 liters/min passed through the spray bar. The head on the degasser/aerator was about 1 meter having a diameter of about 20 cm (8 inches). All piping was PVC and sized as follows: manifold 54, 7.6 mm (3 inches); well 26, 15 mm (6 inches); conduit 28, 5 mm (2 inches); pipe 30, 7.6 mm (3 inches); pipe 40, 5 mm (2 inches); manifolds/conduits/pipes 56, 232, 10, 120, 260, 168, 170, 172, all 7.6 mm (3 inches) and conduit 150, 5 mm (2 inches).

Figure 17:
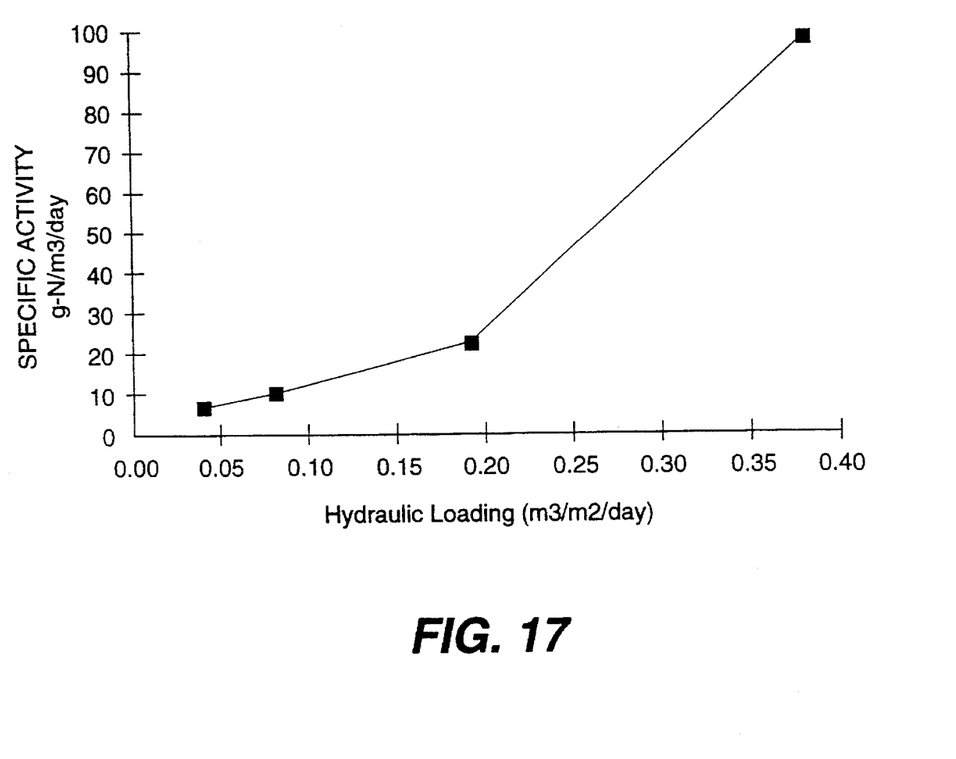
FIG. 17 is a graph showing the increase in specific activity of the biofilter with increase in hydraulic loading.

The growth weight of the char was good and more than doubled in a three month period and the specific activity of the biofilter v hydraulic loading was found to be in line with the graph in FIG. 17 in terms of nitrification capacity per unit volume of filter volume.

Although preferred embodiments have been described and illustrated, other variations in the invention will become obvious to those skilled in the art once they have appreciated the invention and preferred embodiments and variations described herein.

The embodiments of the invention in which an exclusive property or privilege is claimed are defined as follows:

1. In a fish culture water treatment system wherein waste water, clarified of all substantially solid waste material but containing fine particulates and dissolved waste, is to be filtered, a biofilter for the clarified water, comprising:

an open top tank having side walls and a bottom and containing water and a bed of biofilter media pellets having a density of about 0.91–0.93 freely floating in the water;

manifold means for delivering clarified water to be filtered to the open top of said tank;

distribution means in flow communication with said manifold means, said distribution means comprising a rotating spray bar spaced above the bed of floating media pellets for distributing said clarified water over the top of the media bed, means for rotating said spray bar, said spray bar having nozzle means from which water exits and is directed onto a defined surface area of the media pellets as said spray bar is rotated, said clarified water exiting from said spray bar nozzle means to cyclically and repeatedly dynamically load said defined surface area of said media pellets to gently agitate the media pellets on and substantially below the surface of said defined area, the gentle agitation causing the pellets to gently scour each other and permit fine particles and/or excess scoured biofilm to gravitate to the tank bottom;

filtered water outlet means completely below the free floating bed of media pellets and above said tank bottom; and means in flow communication with said outlet means for returning filtered water to said water treatment system.

2. The water treatment system of claim 1 wherein said bottom including sump means below said filtered water outlet means to which fine particulate material comprising said fine particles and/or excess biofilm scoured from the pellets by said agitation gravitate; and means in flow communication with said sump means to selectively and periodically remove said fine particulate material from said sump means.

3. The water treatment system of claim 2 wherein said biofilter tank has a cone-shaped bottom extending upwardly from said tank sump and said filtered water outlet means includes a substantially vertical manifold having a lower portion extending upwardly from within and concentric with said sump, said fine particulate material in said filter tank gravitating along said cone-shaped bottom to said sump and said manifold has a filtered water opening above said sump and completely below said filter media through which water may flow out of said filter tank.

4. The water treatment system of claim 3 wherein said vertical manifold has an inverted cone-shaped baffle covering the upper end of the manifold and said filtered water opening is beneath said baffle, said baffle having a peripheral edge spaced from said cone-shaped bottom.

5. The water treatment system of claim 1 wherein said filtered water outlet means comprises:

a manifold having at least a portion extending upwardly within and generally concentric, with said tank and having an upper end completely below the free floating media pellets;

an inverted cone-shaped baffle covering the upper end of said manifold;

said manifold having an opening in the wall thereof beneath the baffle through which filtered water may flow out of said filter tank.

6. The water treatment system of claim 5 wherein said tank is cylindrical and said sump is concentric with walls of said tank, said tank further having a cone-shaped bottom extending upwardly from said sump and the periphery of said cone-shaped baffle is spaced from said cone-shaped bottom to permit fine particulate material to pass therebetween.

7. The water treatment system of claim 1 wherein said filtered water outlet means comprises a manifold having at least a portion extending substantially vertically upwardly from said bottom in said tank and concentric with walls thereof to a point substantially below the bed of media pellets, said manifold having an open, unscreened upper end.

8. The water treatment system of claim 7 wherein said tank is cylindrical and has a cone-shaped bottom extending upwardly from a sump, said manifold having a lower portion extending upwardly from within and concentric with said sump and means in flow communication with said sump to selectively and periodically remove fine particulate from said sump.

9. The water treatment system of claim 7 wherein said spray bar has two opposed arms at least one arm having an array of nozzle means located for delivering water to the top of said media bed to cause said cyclically dynamic loading of areas of said bed of media pellets as the bar rotates, the location of at least some of the nozzle means on said at least one arm also being such that water exiting therefrom defines said means for causing rotation of said spray bar.

10. The water treatment system of claim 9 wherein said one of said spray bar arms has nozzle means located along at least a portion of one longitudinal side thereof and the other of said spray bar arms has nozzle means located along at least a portion of the bottom thereof; wherein water exiting from the side located nozzle means causes said dynamic loading of said area of the media pellets thereunder and rotation of the spray bar and water exiting from the bottom located nozzle means of said other arm causes only dynamic loading of media pellets thereunder.

11. In a water treatment system wherein waste water, clarified of all substantially solid waste material but containing fine particulates and dissolved waste, is to be filtered, a biofilter for the clarified water, comprising:

a tank having side walls and a bottom and containing water and a bed of biofilter media pellets having a density of about 0.91–0.93 floating in the water;

manifold means for delivering clarified water to be filtered to the tank;

distribution means in flow communication with said manifold means, said distribution means being above the bed of floating media pellets and comprising means for distributing said clarified water over the top of the media bed to cyclically and repeatedly dynamically load areas of the media pellets and to gently agitate the media pellets in such area;

filtered water outlet means below the bed of media pellets and above said tank bottom; and means in flow communication with said outlet means for returning filtered water to said water treatment system;

said means for distributing said clarified water over the media bed comprises a spray bar having two opposed arms rotatably mounted above said media bed, said opposed arms each having an array of nozzle means located for ejecting water onto the top of said media bed, the water ejecting from the nozzle means causing cyclically dynamic loading of said bed of media pellets as the bar rotates, the location of at least some of the nozzle means on said at least one arm is such that water ejecting therefrom also causes rotation of said spray bar;

one of said spray bar arms having nozzle means located along at least a portion of one longitudinal side thereof, whereas the other of said spray bar arms has nozzle means located along at least a portion of the bottom thereof, wherein water ejecting from the side located nozzle means causes dynamic loading of the media pellets thereunder and rotation of the spray bar and water ejecting from the bottom located nozzle means of said other arm causes dynamic loading of media pellets thereunder;

said one spray bar arm having side located nozzle means only on substantially the outer half of said one arm and the other spray bar arm having bottom located nozzle means only on the substantially inner half of said other spray bar arm.

12. In a water treatment system for fish culture having a cylindrical fish tank with water in circular flow therein and a separate biofilter tank for treating dissolved waste water from the tank;

said fish tank having a bottom and side walls, a well associated with the tank bottom substantially at the center thereof to which solid waste in the fish tank gravitate due to circular flow of water in said fish tank;

means screening the well from fish in the tank;

conduit means in flow communication with said well and with stand-pipe means exterior of said fish tank, said stand-pipe means comprising an outer pipe and an inner hollow pipe concentric with said outer pipe, a lower end of said outer pipe having an opening in flow communication with a drain and a lower end of said inner pipe having a periphery adapted to plug said outer pipe opening;

said inner pipe having an opening at substantially the height of water in said fish tank; and the upper end of said inner pipe having means by which the inner pipe can be moved longitudinally relative said outer pipe to selectively unplug said outer pipe opening;

said fish tank including clarified water outlet means for removing water with dissolved wastes from said fish tank, said clarified water outlet means comprising a first manifold adjacent the center of said fish tank and having outlet means above the bottom of said tank and separate from said bottom well, means screening said clarified water outlet means from fish in the tank, said first manifold being in flow communication with said biofilter tank.

13. The water treatment system of claim 12 wherein said first manifold is substantially vertical and extends upwardly from the center of said fish tank with a lower portion of the manifold being within and concentric with said well, a second vertical manifold concentric with and around said first manifold and extending upwardly from the periphery of said well to a height above said first manifold, said second manifold having first solid waste outlet means adjacent said well which includes said means for screening the well from fish in the tank, said second manifold also having clarified water outlet means communicating with said first manifold outlet means which second manifold clarified water outlet means includes said means screening said first manifold outlet means from fish in the tank.

14. In a water treatment system for fish culture having a fish tank with water in circular flow therein and a separate biofilter tank for treating dissolved waste water from the tank;

said fish tank having a bottom and side walls, a well associated with the tank bottom to which solid waste in the fish tank gravitate due to circular flow of water in said fish tank;

clarified water outlet means for removing water with dissolved wastes from said fish tank, said clarified water outlet means comprising a first substantially vertical manifold having a lower portion within and extending upwardly from the center of said well, said first manifold having clarified water outlet means spaced above said well and in flow communication with filtering means, a second vertical manifold concentric with and around said first manifold and extending upwardly from the periphery of said well to a height above said first manifold, said second manifold having solid waste outlet means adjacent said well including means for screening the well from fish in the tank, said second manifold also having clarified water outlet means communicating with said first manifold outlet means which second manifold clarified water outlet means includes means for screening said first manifold outlet means from fish in the tank and conduit means in flow communication with said well and stand-pipe means exterior of said fish tank, said stand-pipe means being in flow communication with a drain and having means by which periodic flushing of solid waste drawn into the well can be flushed to said drain.

15. Apparatus for biofiltering dissolved waste water comprising:

a cylindrical filter tank comprising an open top, side walls and conical-shaped bottom and a sump connected with the center of said bottom;

said sump including means for connection with a particulate waste removal conduit;

a generally vertical manifold having a lower portion within and concentric with side walls of said sump and extending upwardly from the sump, the lower portion of said manifold having means for connection with a filtered water conduit and said manifold having an opening adjacent its upper end;

spray bar means and means for rotatably mounting said spray bar means adjacent the top of said tank, said spray bar means having two opposed arms with nozzle means located in each arm, at least some of said nozzle means in said at least one arm being located whereby water exiting from said at least some of said nozzles would cause rotation of said spray bar;

the nozzle means located in said one spray bar arm being located in the side of the bar along the substantially outer longitudinal half thereof and the nozzle means in the other spray bar arm being located in the bottom and along the substantial longitudinal inner half thereof.

16. Apparatus according to claim 15 wherein said vertical manifold has an inverted cone-shaped baffle on said upper end and said manifold opening is beneath said baffle.

17. Apparatus for use in aquaculture, comprising:

a fish tank having a well centrally located in the bottom thereof and conduit means connecting said well with stand-pipe means exterior of said tank, means screening said well from said fish tank;

said stand-pipe means comprising an outer generally vertical pipe having a lower end opening in flow communication with a drain and having an inner generally vertical pipe concentric with said outer pipe, said inner pipe having a lower end, the interior of which is open to said drain and the exterior of which is adapted to plug said outer pipe opening to said drain, said inner pipe having means adjacent its upper end whereby said inner pipe can be selectively moved longitudinally relative said outer pipe to unplug said outer pipe opening and one of said inner and outer pipes having a pipe wall opening intermediate the ends thereof at a predetermined height and in flow communication with other conduit means;

said apparatus further comprising a substantially vertical first manifold having a lower portion extending upwardly from the center of said fish tank with a lower portion of the manifold being within and concentric with said well, said first manifold having an upper end spaced above said well and an opening substantially at the upper end, a second vertical manifold concentric with said first manifold and extending upwardly from the periphery of said well to a height above that of said first manifold, said second manifold having first outlet means for solid waste adjacent said well which outlet means includes said means for screening the well from said fish tank, said second manifold further having second outlet means for clarified water communicating with said first manifold opening which second manifold outlet means includes means screening said first manifold opening from said tank.

18. The apparatus of claim 17 wherein said wall opening is in the inner pipe and said other conduit means in flow communication with said inner pipe is said drain.

19. The apparatus of claim 17 wherein said wall opening is in the outer pipe and said other conduit means is in flow communication with said fish tank.

20. The apparatus of claim 19 further includes a filter/sterilizer means is within said other conduit means.

21. In a water treatment system for fish culture having a cylindrical fish tank with water in circular flow therein and a separate biofilter tank containing a plurality of floating media pellets for treating dissolved waste water from the tank;

said fish tank having a bottom and side walls, a well associated with the center of said tank bottom to which solid waste in said fish tank gravitate due to circular flow of water in said fish tank;

means screening said well from fish in the tank;

first conduit means in flow communication with said well and with stand-pipe means exterior of said fish tank, said stand-pipe means being in flow communication with a drain and comprising means by which a small amount of water in said fish tank can flow substantially continually from said tank to draw said wastes into said well and means by which solid wastes in said well can be selectively flushed from said well to said drain;

clarified water outlet means for removing water with dissolved wastes from said fish tank, said clarified water outlet means comprising a manifold adjacent the center of said fish tank and having an opening above the bottom of said tank and spaced from said bottom well, means screening said manifold opening from fish in the tank;

second conduit means in flow communication with said clarified water outlet manifold and including two branches, a first branch of said second conduit means being in flow communication with aerator means and said fish tank and a second branch of said second conduit means being in flow communication with spray bar means mounted above said floating media pellets in said biofilter tank;

pump means within said second conduit means for pumping water from said fish tank to said two second conduit branches;

said spray bar being rotatably mounted in association with the top of said biofilter above said floating media pellets and including opposed arms with nozzle means located in both said arms, said nozzle means being located such that water exiting said nozzle means causes rotation of said spray bar and further causes cyclic, dynamic flow loading of said media pellets in said biofilter tank over the width of said tank;

said biofilter tank having side walls and a bottom wall, said bottom wall including a sump to which fine particulate material in said filter tank gravitates;

third conduit means associated with said sump whereby particulate material accumulating in said sump may be selectively flushed therefrom;

filtered water manifold means having an outlet opening located above said sump and below said floating media pellets for removing filtered water from said biofilter tank;

fourth conduit means in flow communication with said filtered water manifold means and said fish tank to return filtered water to said fish tank; and means for introducing make-up water to said fish tank to maintain a predetermined level of water in said fish tank.

* * * * *